73. MEASURING AND TESTING.
321
A. & W. GUTHRIE & T. L. HUMES.
Water Gage.
No. 61,826.           Patented Feb. 5, 1867.
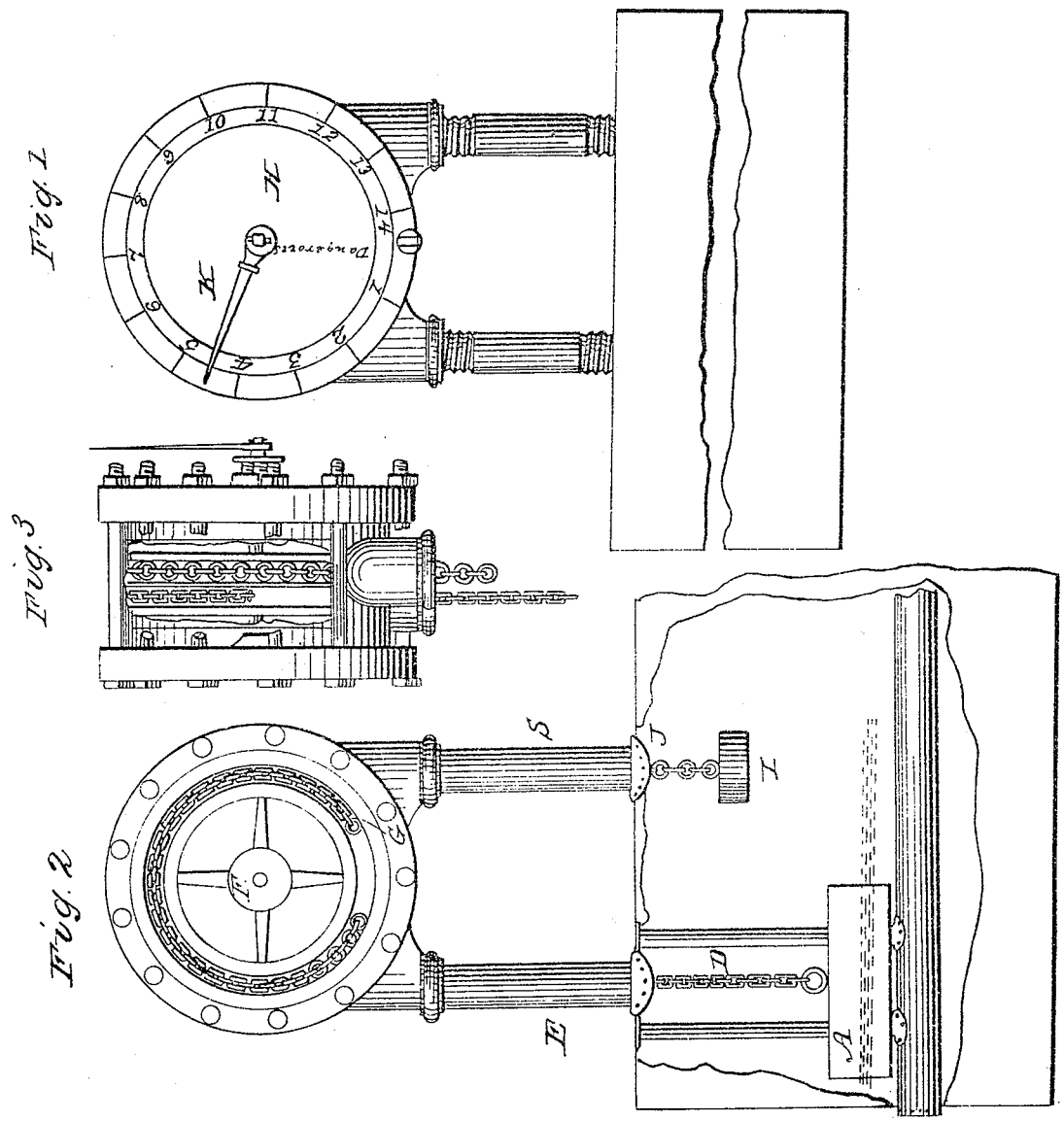
Witnesses
Inventor

United States Patent Office.

ALFRED GUTHRIE, WARDELL GUTHRIE, AND THOMAS L. HUMES, OF CHICAGO, ILLINOIS.

Letters Patent No. 61,826, dated February 5, 1867.

---

IMPROVEMENT IN WATER-INDICATORS FOR BOILERS.

---

The Schedule referred to in these Letters Patent and making part of the same.

---

TO ALL WHOM IT MAY CONCERN:

Be it known that we, ALFRED GUTHRIE, WARDELL GUTHRIE, and THOMAS L. HUMES, of the city of Chicago, in the county of Cook, and State of Illinois, have invented a new and improved Water Gauge for determining and indicating the height of water in steam boilers; and also connected therewith a device or plan for indicating when the steam of a boiler is subjected to an undue pressure, or is superheated in consequence of low water, operating in connection with the same gauge, though incidental to it, by means of alloyed metal; and we do hereby declare that the following is a full and exact description thereof, reference being had to the accompanying drawings, and to the letters of reference marked thereon.

The nature of our invention consists in suspending a given weight in the water of the boiler by a chain or cord wound over a wheel or attached to a lever, to which is attached a counterbalance weight suspended out of the water that will just balance the immersed weight, thereby converting it into a real, substantial float or buoy, though it be made of solid metal; in other words, taking advantage of a well-known principle of science that a stone or piece of metal weighs less when immersed in water than in the air, by just so much as the water it displaces. From this difference of weight we are enabled to obtain a sufficient power or force to operate with absolute certainty and precision the shaft and index hand through its necessary stuffing-boxes, and consequent friction designed to indicate outside the exact stage of water within. In connection herewith, the counterbalance weight may be made of fusible alloy, or the part by which it is suspended only, which fusing, at a given temperature, will melt and fall down, relieving the immersed weight of its counterbalance, when it will sink and indicate through the index hand the dangerous condition inside the boiler.

To enable others skilled in the art to make and use our invention, we will proceed to describe its construction and operation, first referring to the drawings and letters marked thereon.

Figure 1 shows the gauge all complete and attached to the boiler, with its face and index hand in view of the engineer in charge.

Figure 2 shows the gauge open to view, with an opening in the boiler.

A shows a weight of cast iron or other material, as may be convenient, about eight inches square by four inches deep, varying more or less, as may be found necessary to insure a certain operation of the index hand; if using material other than iron, it is suspended half deep in the water, with the flat side up, by the chain D, which passes up through the pipe E and over the wheel F, and fastened (as seen) at G. H shows a steam-tight case, in which the wheel and chain work when put together, as in fig. 1. I shows a smaller weight, in whole or in part of alloyed metal, which fuses at a given temperature desired, and suspended above the water by its chain, J, which also passes over the wheel F, but in a contrary direction from the chain D, and fastened likewise in the rim. Now it is plain as one weight rises the other must fall, and vice versa, winding the chains over the wheel to obtain sufficient length for the rise and fall of the water in the boiler. The whole is complete and ready for operation, which is simple and plain, and is as follows:

When the water in the boiler rises or falls, the weight or buoy will rise or fall with it, and turn the wheel F, which works the index hand K, noting the exact height of the water in inches or parts of inches over the flues. Again, if the steam should become, from any cause, overheated, the fusible alloy weight will melt and fall away, leaving the immersed weight without its counterbalance, and it falls to the bottom, turning the index hand to the point marked "dangerous," as indicative of too high pressure or of superheated steam. We prefer having the heavy float or buoy about half immersed, so that it may, in case of sand or dirt accumulating upon it, regulate itself either way, as the case may be, by immersing or exposing more surface above the water. S, in fig. 2, shows the pipe through which the chain J passes to the wheel, as above. Although the drawings show two pipes, one for each of the chains, yet both may pass in one pipe, as shown in fig. 3.

What we claim as our invention, and desire to secure by Letters Patent, is—

The combination of the floating weight with its equivalent counterbalance weight, operating in the manner and for the purpose herein set forth and described.

ALFRED GUTHRIE,
THOS. L. HUMES,
WARDELL GUTHRIE.

Witnesses:
T. S. CHAMBERLIN,
A. T. SHERMAN.